(12) United States Patent
Ruppert et al.

(10) Patent No.: US 11,844,342 B2
(45) Date of Patent: Dec. 19, 2023

(54) ELECTRONICALLY CONTROLLED VALVE SYSTEM FOR DISTRIBUTING PARTICULATE MATERIAL

(71) Applicant: CNH Industrial America LLC, New Holland, PA (US)

(72) Inventors: Rex Ruppert, Benson, MN (US); Randy Lindemeier, Willmar, MN (US); Jeffrey Scot Martin, Benson, MN (US); Jeremy Amundson, Willmar, MN (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 302 days.

(21) Appl. No.: 16/834,234

(22) Filed: Mar. 30, 2020

(65) Prior Publication Data
US 2021/0298286 A1 Sep. 30, 2021

(51) Int. Cl.
*A01M 7/00* (2006.01)
*F16K 1/22* (2006.01)
*F16K 31/04* (2006.01)

(52) U.S. Cl.
CPC .......... *A01M 7/0089* (2013.01); *A01M 7/005* (2013.01); *F16K 1/22* (2013.01); *F16K 31/041* (2013.01)

(58) Field of Classification Search
CPC ................ A01M 7/005; A01M 7/0089; F16K 1/22–228; F16K 31/041–045; F02D 9/08; F02D 9/10; A01C 7/082; A01C 7/102
See application file for complete search history.

(56) References Cited

U.S. PATENT DOCUMENTS

| | | | |
|---|---|---|---|
| 3,191,906 A | 6/1965 | Zeigler et al. | |
| 5,168,900 A | 12/1992 | Johnson | |
| 5,593,131 A * | 1/1997 | Briggs, Jr. | ................ F23K 3/02 251/117 |
| 5,775,585 A * | 7/1998 | Duello | ................... A01C 15/04 239/654 |
| 5,979,343 A | 11/1999 | Gregor et al. | |
| 6,273,141 B1 | 8/2001 | Desellem | |
| 9,578,800 B2 | 2/2017 | Beaujot | |
| 10,059,191 B2 | 8/2018 | Wright | |
| 10,285,324 B2 | 5/2019 | Gilstring | |

(Continued)

FOREIGN PATENT DOCUMENTS

| CA | 2993531 | 2/2019 |
|---|---|---|
| CN | 207142310 | 3/2018 |

*Primary Examiner* — Tuongminh N Pham
(74) *Attorney, Agent, or Firm* — Rebecca Henkel; Rickard DeMille (57) ABSTRACT

The present invention provides an electronically controlled valve in each air distribution line for delivering product-conveying air to a boom section of an agricultural machine. The valves can be used to balance airflow between lines by controlling back pressure at the boom sections. In one aspect, an electronically controlled butterfly valve can be installed in each air line between a fan's plenum outlet and a dry product delivery meter. Each valve can be configured to allow some flow when in a closed position. This could be achieved, for example, by configuring a valve plate with a circular perimeter shape that has a smaller diameter than an inner diameter of the line or tube in which the valve plate is mounted.

18 Claims, 7 Drawing Sheets

(56) References Cited

U.S. PATENT DOCUMENTS

| | | | |
|---|---|---|---|
| 2004/0051071 A1* | 3/2004 | Ando | F16K 1/222 |
| | | | 251/305 |
| 2009/0114868 A1* | 5/2009 | Lee | F16K 39/028 |
| | | | 251/305 |
| 2010/0034049 A1 | 2/2010 | Ferri et al. | |
| 2010/0219363 A1* | 9/2010 | Telep | F16K 1/22 |
| | | | 251/305 |
| 2013/0192503 A1* | 8/2013 | Henry | A01C 7/082 |
| | | | 111/14 |
| 2019/0021214 A1 | 1/2019 | Roberge et al. | |
| 2020/0332920 A1* | 10/2020 | Curry | F16K 49/002 |
| 2021/0127556 A1* | 5/2021 | Graham | A01C 7/102 |

* cited by examiner

ELECTRONICALLY CONTROLLED VALVE SYSTEM FOR DISTRIBUTING PARTICULATE MATERIAL

FIELD OF THE INVENTION

The present invention pertains to agricultural equipment and, more specifically, to a system for distributing particulate material from an applicator in which valves in supply lines for entraining particulate material in airflow are configured to actuate between open and closed positions in which the open position maximizes airflow in the supply line by minimizing restriction of airflow presented by the valve and the closed position minimizes airflow in the supply line by maximizing restriction of airflow presented by the valve while still allowing a minimum airflow to pass.

BACKGROUND OF THE INVENTION

Agricultural product delivery systems are known to utilize various mechanisms, including mechanical and pneumatic systems to move granular or particulate material or product, such as fertilizer, seed, insecticide or herbicide, from a product supply chamber, through a series of elongated tubes that extend from a product supply chamber to a product applicator, and placing the product on, or in a growing medium, such as soil. Such agricultural product delivery systems are commonly employed in planters, air drills, fertilizer and pesticide applicators and a variety of other agricultural implements.

In systems as described, it is often desirable to apply dry product to agricultural fields in a target amount, which could be measured, for example, in pounds per acre. When applying dry product while traveling in a straight line, the target amount of product application can be achieved by controlling a delivery rate, which could be measured, for example, in pounds per minute, as a function of travel speed. However, when turning, there is typically a speed differential between the turn's inside and outside boom sections. The boom's outside section sweeps over a greater distance than its inside section in the same amount of time, so more product needs to be delivered toward the boom's outside section to maintain the aforementioned target amount of product application.

Implementing separate dry product meters for separate boom sections can allow for sectional control, including turn compensation, by delivering dry product at different rates to the different boom sections. However, controlling overall flow characteristics to different boom sections can be challenging because a single fan (or each of multiple fans) typically provides a volume(s) of flowing product delivery air to multiple boom sections. Comparing sections that receive delivery air from the same fan, sections that receive more product will provide greater back pressure against the fan than sections that receive less product. This can lead to more of the airflow being passively directed to the sections receiving less product because they exhibit less flow resistance, create a plugging risk or other flow-compromise(s) at the sections receiving more product, which can create delivery inconsistencies. A need therefore exists to provide a system for distribution of particulate material that eliminates one or more of the foregoing disadvantages.

SUMMARY OF THE INVENTION

The present invention provides an electronically controlled valve in each air distribution line for delivering product-conveying air to a boom section of an agricultural machine. The valves can be used to balance airflow between lines by controlling back pressure at the boom sections. In one aspect, an electronically controlled butterfly valve can be installed in each air line between a fan's plenum outlet and a dry product delivery meter. Each valve can be configured to allow some flow when in a closed position. This could be achieved, for example, by configuring a valve plate with a circular perimeter shape that has a smaller diameter than an inner diameter of the line or tube in which the valve plate is mounted. The circular valve plate can be concentrically centered in the air line and mounted on a shaft that is driven to pivot by an electric motor or other actuator. When in a fully closed position, the valve plate can extend perpendicular to a longitudinal axis of the line. This can present an entire surface area of the valve plate to resist airflow to the line, forcing the airflow through an annular gap between an outer edge of the circular valve plate and an inner circumferential surface of the air line, providing the greatest amount of back pressure against the fan. When rotated 90-degrees from the fully closed position to a fully open position, the valve plate can present only its edge to resist the airflow to the line, which provides the least amount of back pressure against the fan. A turn-compensation controller can control the position of each valve to provide total control of airflow across the boom while simultaneously establishing a product delivery rate differential across the boom during a turning maneuver. Sections that are airflow linked to each other can have their inside-line valve(s) turned to a more restrictive position than their outside-line valve during a turning maneuver. This can equalize back pressure that would otherwise be different due to different amounts of product delivery in the lines, as part of a turn compensation product delivery protocol which ensures adequate airflow through the line receiving more product. Such a valve system could provide reduced power consumption and/or pressure balancing with respect to boom sections. In addition, various shapes of valve plates can be implemented, preferably having features which allow some flow while fully closed. These could include a central bore or other perforations and cut-out segments or removed material for the outer periphery of the valve plate.

The invention also provides a system for equalizing airflow in lines delivering product-conveying air to boom sections of an agricultural machine by electronically controlling valves in each air distribution line to induce additional pressure drops in lines which would cause imbalance in the system. Such valves can include, but are not limited to: ball valves, butterfly valves, gate valves, globe valves, diaphragm valves, pinch valves and/or plug valves.

In any system where airflow is divided from one source to multiple destinations, there is the possibility of creating imbalance in the system in certain scenarios such as: going up or across a hill, shutting off product flow when passing over an area previously applied, increasing product flow to the sections on the outer radius of a turn and reducing the product flow to the sections on the inner radius of the turn. In these scenarios, the increased/decreased pressure drop induced in each line can vary. With the proposed system, the lines of least pressure drop can be induced with additional pressure drop by particular valves in order to bring the lines back to a balanced state. This can be accomplished, for example, with a feedback system in which pressure can be monitored upstream with a valve adjusting its opening to maintain a same pressure as a line on the opposite side of the machine/implement. It can also be accomplished without a feedback system, such as where valve position is selected based on metering rate and/or slope percentage. Accordingly, the present invention can allow greater flexibility in regard to system design due to less sensitivity to changes. For example, boom sections can have large variations in pressure drop while the aforementioned valves compensate to result in balanced airflow.

Specifically then, one aspect of the present invention can provide a system for distributing particulate material from an applicator. The system can include: multiple supply lines, each supply line being configured to receive an airflow and entrain particulate material in the airflow; multiple boom sections, each boom section being connected to a supply line for receiving an airflow and entrained particulate material, each boom section including multiple nozzles for distributing particulate material; and multiple electronically controlled valves, each valve being arranged in a supply line, each valve being configured to actuate between open and closed positions. The open position can be configured to maximize airflow in the supply line by minimizing restriction of airflow presented by the valve. The closed position can be configured to minimize airflow in the supply line by maximizing restriction of airflow presented by the valve while allowing a minimum airflow to pass.

Another aspect of the present invention can provide a method for distributing particulate material from an applicator. The method can include: providing multiple supply lines, each supply line for receiving an airflow and entraining particulate material in the airflow; providing multiple boom sections, each boom section being connected to a supply line for receiving an airflow and entrained particulate material, each boom section including multiple nozzles for distributing particulate material; and providing multiple electronically controlled valves, each valve being arranged in a supply line; providing multiple electronically controlled valves, each valve being arranged in a supply line, each valve actuating between open and closed positions. The open position can maximize airflow in the supply line by minimizing a restriction of airflow presented by the valve. The closed position can minimize airflow in the supply line by maximizing restriction of airflow presented by the valve while allowing a minimum airflow to pass.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIG. 1 illustrates an isometric view of an exemplary embodiment of an agricultural application implement in the form of a dry granular applicator, comprising a system for distributing particulate material in accordance with an aspect of the present invention;

FIG. 2 illustrates a side elevation view of the applicator of FIG. 1, in accordance with an aspect of the present invention;

FIG. 3 illustrates a pneumatic conveying system of the applicator of FIG. 1 for distributing particulate material through boom sections in accordance with an aspect of the present invention;

FIG. 4 illustrates a diagram for electronically controlling valves arranged in supply lines of the applicator of FIG. 1 to reduce pressure differentials in accordance with an aspect of the present invention; and FIGS. 5-10 illustrate exemplar valves in accordance with various aspects of the present invention.

While the invention is described herein in connection with certain preferred embodiments, there is no intent to limit it to those embodiments. On the contrary, the intent is to cover all alternatives, modifications and equivalents within the spirit and scope of the invention as defined by the appended claims.

DETAILED DESCRIPTION OF THE INVENTION

Referring now to the drawings, and more particularly to FIGS. 1 and 2, there is shown an agricultural application implement 10, which could be a dry pneumatic granular applicator. As is known in the art, implement 10 generally includes a large wheeled transport unit 12 such as truck or tractor, and laterally extending particle delivery booms 14 and 16, which may be pivoted to a stowed position close to the implement for storage or transport. Each boom 14, 16 extends laterally from the implement 10 in opposite directions. Each boom 14, 16 includes a plurality of boom sections 17, such as left outer and left inner boom sections **17*a*, 17*b* of boom 14, and right inner and right outer boom sections 17*c*, 17*d* of boom 16. Each boom section 17 is defined by a large diameter supply line 102 for supplying the boom section with granular or particulate material, such as seed, fertilizer, herbicide, insecticide and the like. Each boom section 17 includes a plurality of boom tubes or conduits terminating at particle delivering units, which for the implement 10 are spreading outlets or nozzles. In the exemplary embodiment shown, left outer boom section 17*a* of boom 14 includes five nozzles 18, 19, 20, 22 and 24; left inner boom section 17*b* of boom 14 includes five nozzles 26, 28, 29, 30 and 32; right inner boom section 17*c* of boom 16 includes five nozzles 34, 35, 36, 38 and 40; and right outer boom section 17*d* of boom 16 includes five nozzles 42, 44, 45, 46 and 48. Additionally, at the back of implement 10 there is a centrally mounted rear boom section 17*e* also defined by a large diameter supply line 102 for supplying the boom section with granular material. At the rear boom section 17*e* are five rear nozzles 50, 52, 54, 56 and 58 to provide full and complete coverage across the width of implement 10, including the area between the inboard-most nozzles 32 and 34 of booms 14, 16. The rear boom section 17*e* allows spread of the particulate material/product over/onto the ground over which the implement 10 passes for complete coverage. Although five boom sections 17, with five nozzles per boom section, is shown by way of example, in other aspects greater or fewer boom sections 17, and/or greater or fewer nozzles per boom section 17**, can be provided within the scope of the invention.

The transport unit 12 can be self-propelled by an engine in an engine compartment 59 and can include an operator cab 60 having a Human Machine Interface (HMI) available to the user. In the exemplary embodiment shown, an uncovered tank 62 includes compartments 66 and 70 for carrying particulate material to be distributed in a metering section 80 for ultimate disbursement by nozzles 18-58. Further smaller compartments 64 and 68 are provided to supply micronutrients or other materials in the metering section 80. The supply of particulate in compartments 64, 66, 68, 70 can be replenished periodically from a supply vehicle (not shown).

Figure 1:
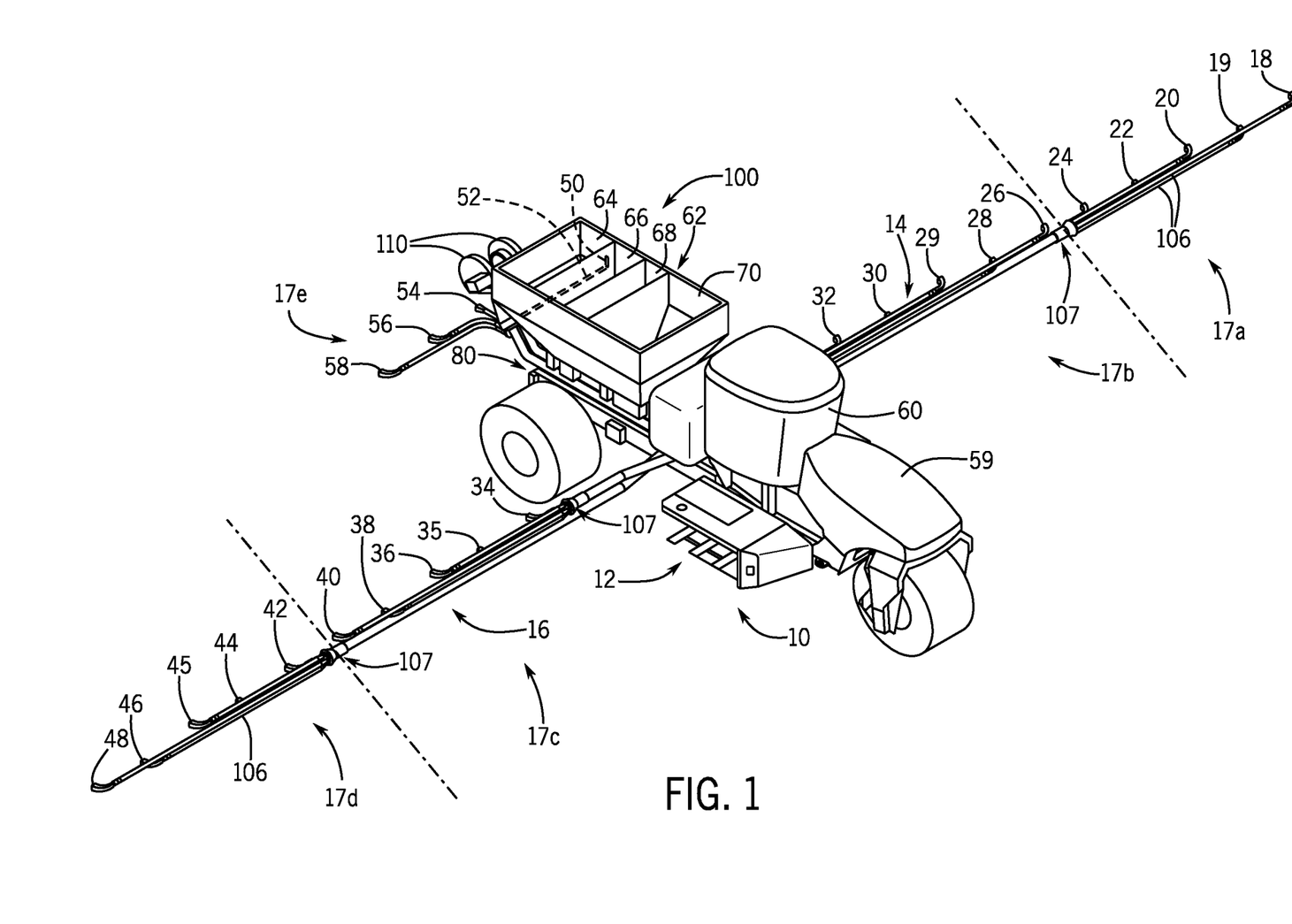
Figure 2:
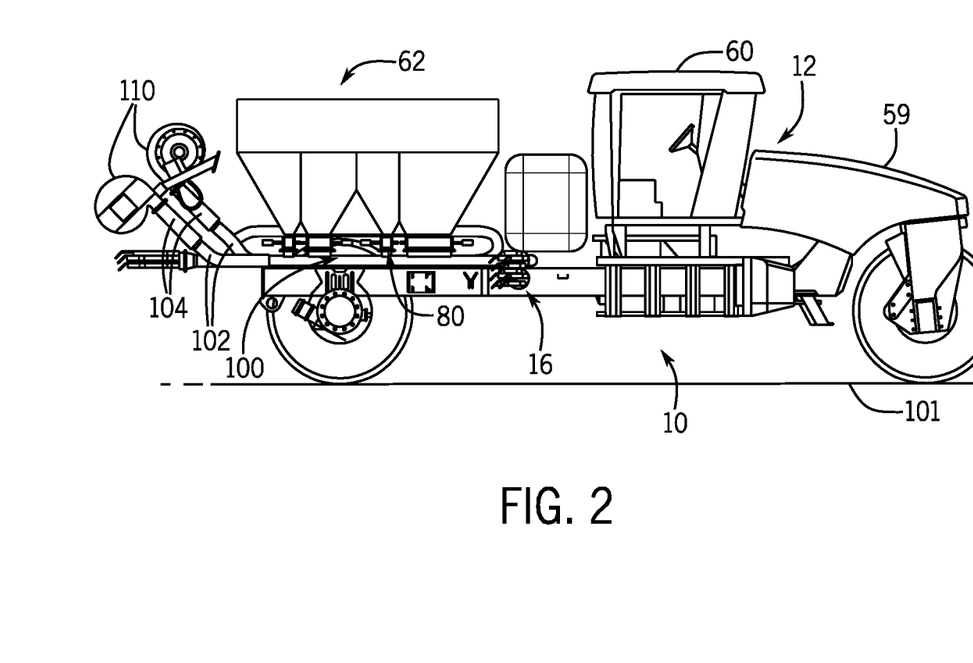
Figure 3:
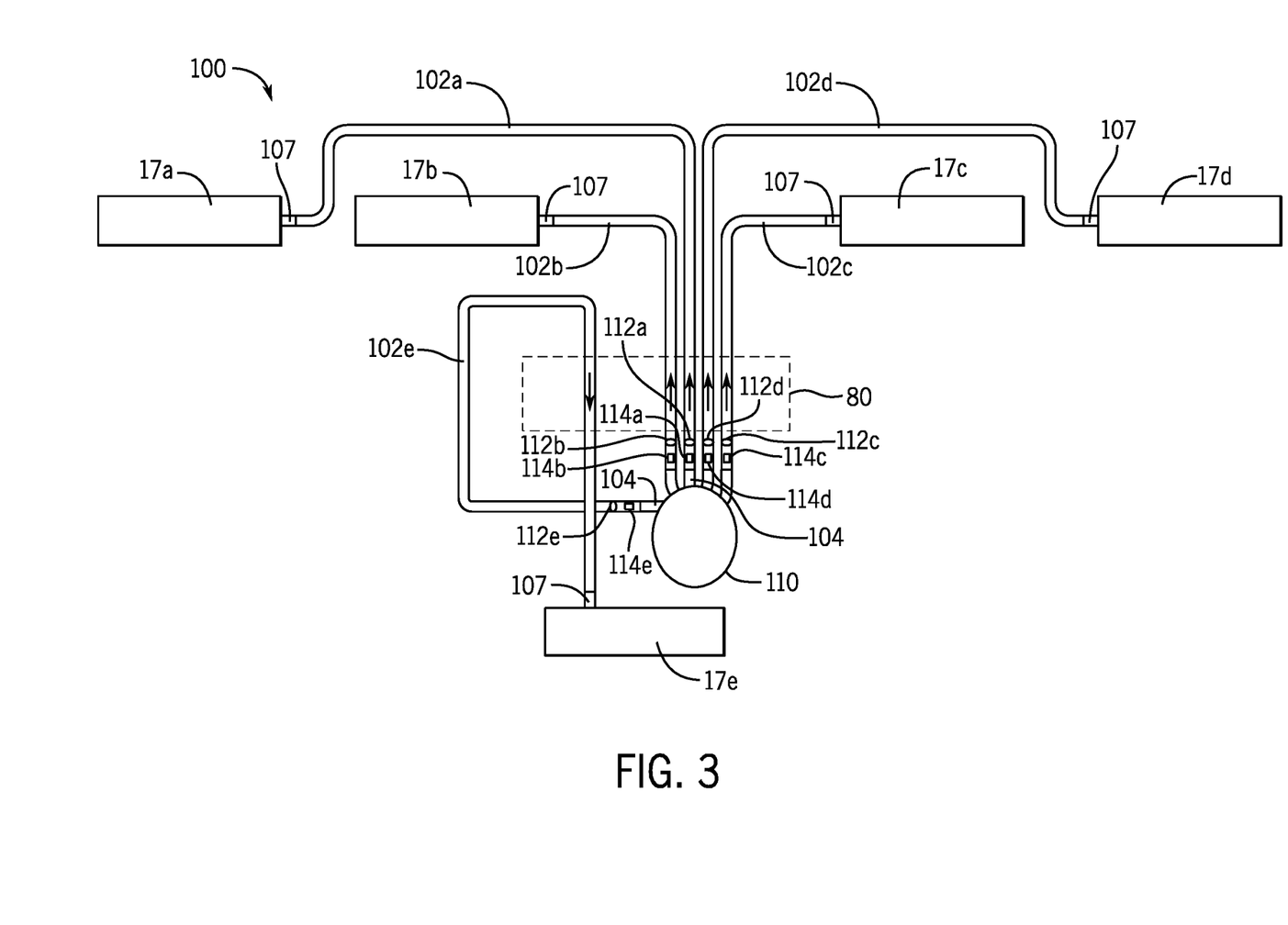

As shown in FIGS. 1-3 by way of example, the compartments 64-70 of the tank 62 and the metering section 80 are disposed directly above a conveying system 100, which could be a pneumatic conveying system or assembly. The conveying system 100 includes multiple large diameter supply lines 102, which could be 5 inches in diameter, that extend from a plenum 104 at one end, under the compartments 64-70 and terminate at individual boom sections 17. At each boom section 17, the supply lines 102 and the particulate material or product transported therein are split by a suitable distribution structure or mechanism 107, such as a plurality of horizontal rotary distributors, among or into a number of secondary or smaller supply lines 106, which could be 2.5 inches in diameter, that are connected to individual nozzles 18-58.

To collect and drive the particulate material along the lines 102, one or more fans 110 can be operably connected to the plenum 104 opposite the inlet ends of lines 102 as described herein. The air flow from the fans 110 is directed from through the plenum 104 and into the respective lines 102 as a result of the structure of the plenum 104. After the air flow passes through the plenum 104 and collects/entrains the particulate material from the compartments 64-70 via the metering section 80, the air flow continues to flow along each large diameter supply line 102, including with one or more 90° and/or 180° turns, to connect to the various boom sections 17. The fans 110 could be centrifugal fans that are 8 inches or less in diameter, and in some aspects, 6 inches or less.

As shown in FIG. 3, electronically controlled valves 112 can be arranged in in each supply line 102 in accordance with an aspect of the invention. The valves 112 in each supply line 102 can allow for equalizing airflow between the supply lines 102, such as when going up or across a hill, passing over an area previously applied, turning the machine, and the like. The valves 112 can be arranged in the supply lines 102 between the fans 110 and the metering section 80, or more particularly, between the plenum 104 and the metering section 80. For example, the valves 112 could include: a first valve 112a in a first supply line 102a connected to the left outer boom section 17a; a second valve 112b in a second supply line 102b connected to the left inner boom section 17b; a third valve 112c in a third supply line 102c connected to the right inner boom section 17c; a fourth valve 112d in a fourth supply line 102d connected to the right outer boom section 17d; and a fifth valve 112e in a fifth supply line 102e connected to the rear boom section 17e. The valves 112 could comprise, for example, ball valves, butterfly valves, gate valves, globe valves, diaphragm valves, pinch valves and/or plug valves.

Each valve 112 can be configured to selectively actuate to restrict airflow in a supply line 102 in order to induce pressure in the supply line 102 for balancing with respect to another supply line 102. In particular, each valve 112 can be configured to selectively actuate through a continuous range of positions between fully open and fully closed positions, such as through a range of 90-degrees. For example, when turning the implement 10 to the right, in a direction away from the left outer boom section 17a, thereby requiring an increase in granular material in the first supply line 102a connected to the left outer boom section 17a for covering the radius of the turn, thereby causing a backpressure in the supply line 102a producing a pressure differential, the fourth valve 112d can be controlled to induce pressure in the fourth supply line 102d, connected to the right outer boom section 17d, so that the pressure differential between the fourth supply line 102d and the first supply line 102a can be reduced. Moreover, valves 112 in adjacent supply lines 102 can similarly induce pressures of varying degrees in their respective lines. This advantageously results in a balanced airflow between the supply lines 102.

In addition, pressure sensors 114 can be arranged in each supply line 102, also between the fans 110 and the metering section 80, for monitoring pressures and calculating pressure differentials between the supply line 102. For example, the pressure sensors 114 could include: a first pressure sensor 114a in the first supply line 102a; a second pressure sensor 114b in the second supply line 102b; a third pressure sensor 114c in the third supply line 102c; a fourth pressure sensor 114d in the fourth supply line 102d; and a fifth pressure sensor 114e in the fifth supply line 102e.

Figure 4:
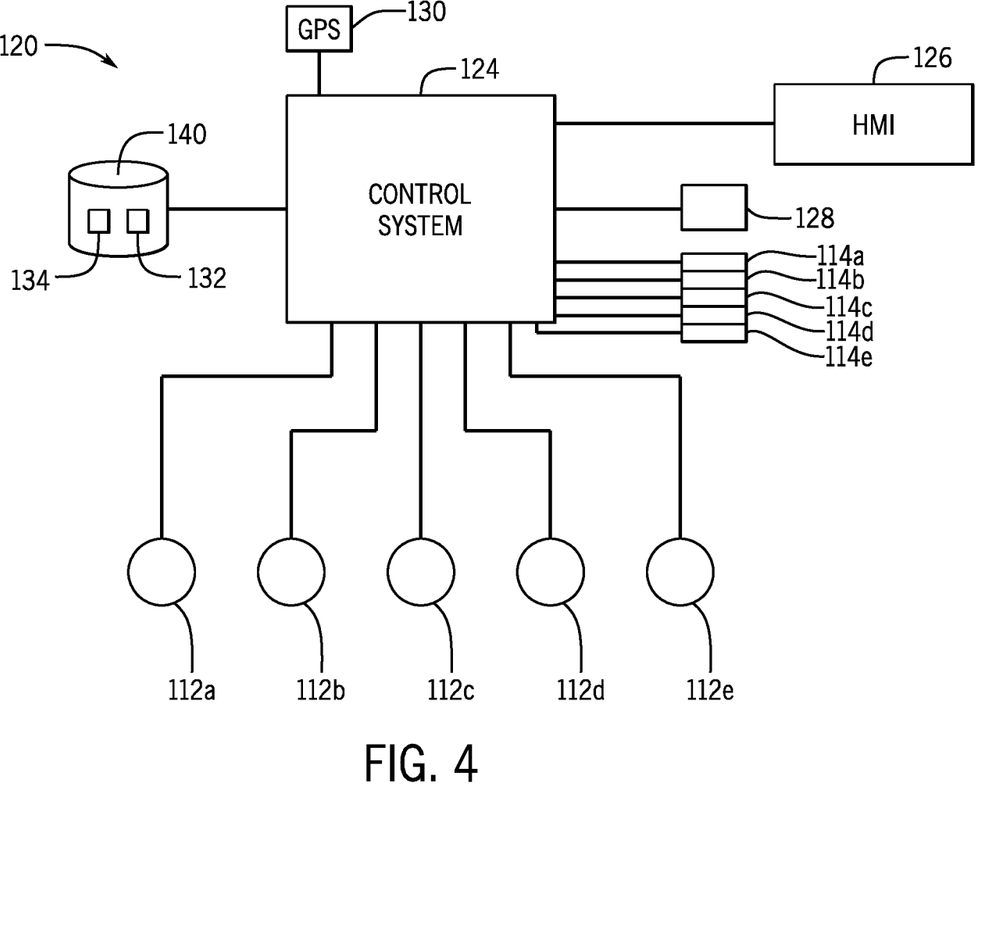

Referring now to FIG. 4, a diagram of a distribution system 120 of the implement 10 for electronically controlling valves arranged in the supply lines 102 to reduce pressure differentials is provided in accordance with an aspect of the present invention. The distribution system 120 can include a control system 124, such as a microcontroller or other programmable logic, in communication with the valves 112a-112e, the pressure sensors 114a-114e, an HMI 126 provided in the cab 60, one or more machine sensors 128, such as an angle sensor, inclinometer and/or speed sensor, and a non-transient medium 140. The control system 124 can also be in communication with a location system 130, such as a Global Positioning System (GPS), and prescription map 132, which could be stored in a non-transient medium 140, for determining a target amount of particulate material for applying to areas of an agricultural field, which could be measured in pounds per acre. The control system 124 can also be in communication with the metering section 80 for controlling a delivery rate of the particulate material, which could be measured in pounds per minute. Accordingly, the control system 124 can execute a program 134 stored in the non-transient medium 140 for distributing the particulate material in the field, such as by selectively controlling individual meter rollers, of the metering section 80, corresponding to individual supply lines 102 leading to sections 17a-17e, and by individually controlling valves 112a-112e to selectively induce pressures in supply lines 102a-102e so that pressure differentials between the supply lines 102 are reduced, particularly during events such as going up or across a hill, passing over an area previously applied, turning the machine, and the like.

The pressure sensors 114a-114e can be used by the control system 124 to continuously monitor pressures in the supply lines 102, and calculate pressure differentials between the supply lines 102, for selectively controlling valves 112a-112e to reduce such pressure differentials. In addition, or alternatively, the one or more machine sensors 128 can be used by the control system 124 to determine such pressure differentials between the supply lines 102, for selectively controlling valves 112a-112e to reduce the pressure differentials. In one aspect, the machine sensor 128 could utilize an angle sensor and speed sensor for determining pressure differentials in supply lines 102 during turns. In another aspect, the machine sensor 128 could utilize an inclinometer and speed sensor for determining pressure differentials in supply lines 102 when going up or across a hill. Such variations are within the scope of the invention.

In addition, the HMI 126 can be configured to indicate an actuation condition for each of the valves 112a-112e. This could be displayed, for example, to an operator in the cab 60. Actuation conditions for valves 112 could comprise, for example, indications of whether particular valves 112 are fully open, fully closed, or somewhere in between, in the 90-degrees of rotation, including with estimates of pressures and allowed airflows in the supply lines 102.

Figure 5:
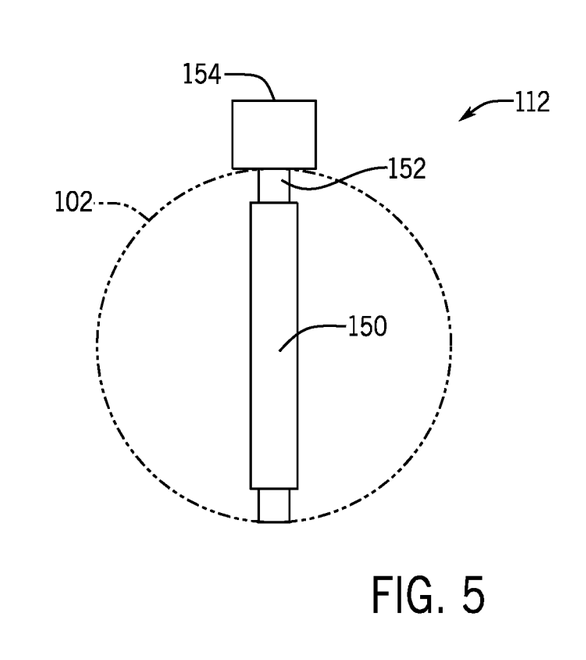
Figure 6:
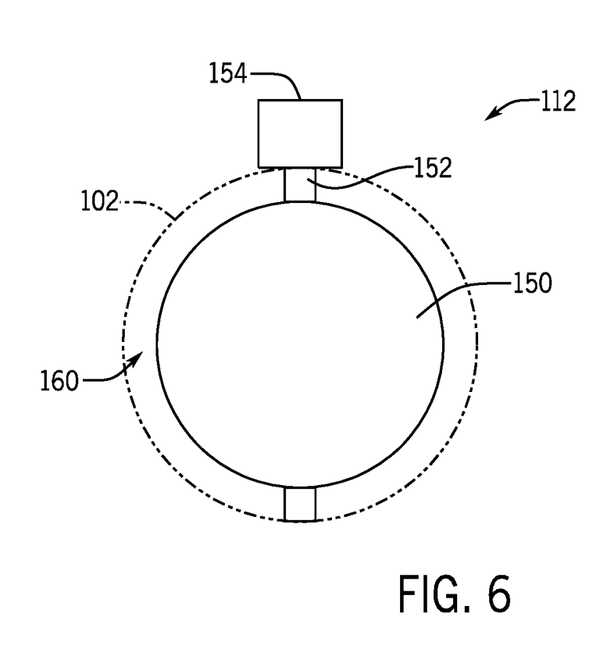
Figure 7:
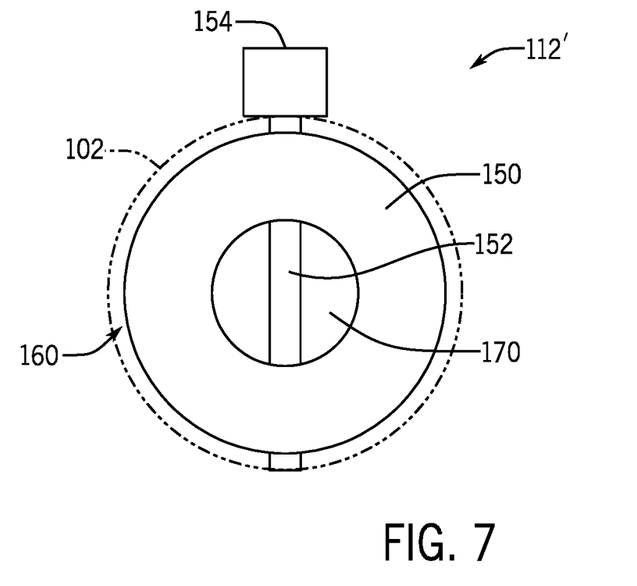
Figure 8:
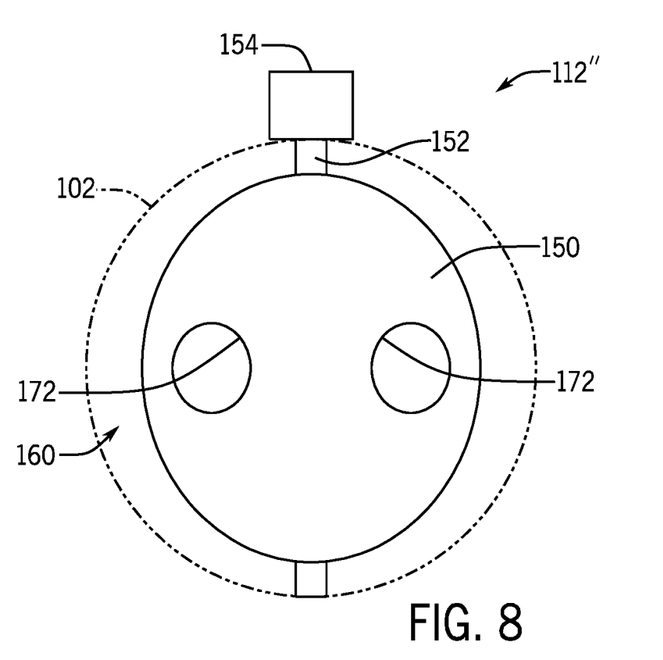
Figure 9:
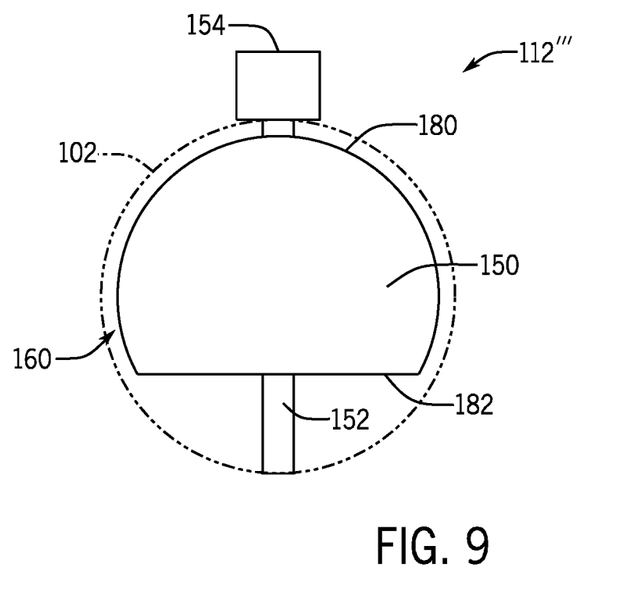
Figure 10:
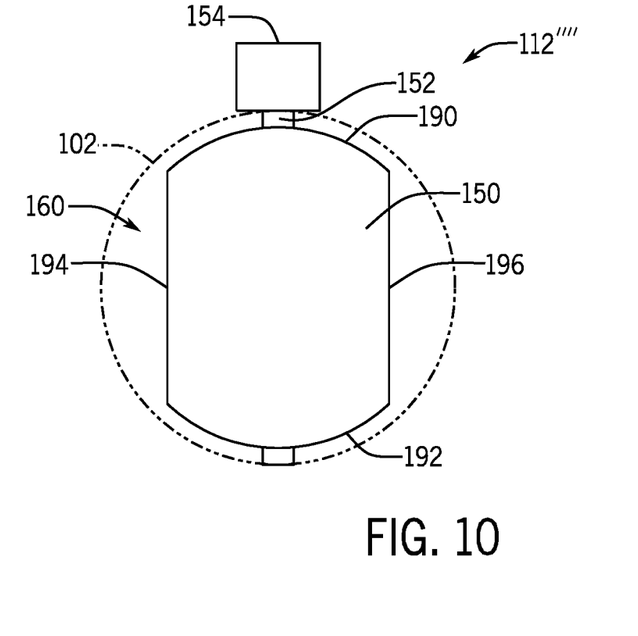

With additional reference to FIGS. 5 and 6, an exemplar valve 112 which could be used in a supply line 102 of the implement 10 is provided in accordance with an aspect of the invention. The valve 112 could be a valve configured to actuate between an open position, as illustrated in FIG. 5, and a closed position, as illustrated in FIG. 6. In particular, the valve 112 could be a butterfly valve configured to regulate the flow of air using a closing mechanism, such as a disk or plate, which rotates 90-degrees between open and closed positions. The open position can be configured to maximize airflow in the supply line 102 by minimizing restriction of airflow presented by the valve 112. The closed position can be configured to minimize airflow in the supply line 102 by maximizing restriction of airflow presented by the valve 112 while allowing a minimum airflow to pass. Accordingly, each valve 112 can be configured to still allow some airflow even when in a closed position (FIG. 6). This could be achieved, for example, by configuring a valve plate 150 with a circular perimeter shape that has a smaller diameter than an inner diameter of the supply line 102 in which the valve plate 150 is mounted. The circular valve plate 150 can be concentrically centered in the supply line 102 and mounted on a shaft 152 that is driven to pivot by an electric motor 154 or other actuator controlled by the control system 124. When in a fully closed position (FIG. 6), the valve plate can extend perpendicular to a longitudinal axis of the supply line 102. This can present an entire surface area of the valve plate 150 to resist airflow to the supply line 102, forcing the airflow through an annular gap 160 between an outer edge of the circular valve plate 150 and an inner circumferential surface of the supply line 102, providing the greatest amount of back pressure against the one or more fans 110. When rotated 90-degrees from the fully closed position to a fully open position (FIG. 5), the valve plate 150 presents only its edge to resist the airflow to the supply line 102, which provides the least amount of back pressure against the one or more fans 110.

Accordingly, the control system 124 can control the position of each valve 112 to provide total control of airflow across boom sections 17a-17e while simultaneously establishing a product delivery rate differential across the boom sections during a turning maneuver. Boom sections 17 that are airflow linked to each other can have their inside-line valve(s) 112 turned to a more restrictive position than their outside-line valve 112 during a turning maneuver. This can equalize back pressure that would otherwise be different due to different amounts of product delivery in the supply lines 102, as part of a turn compensation product delivery protocol which ensures adequate airflow through the supply line 102 receiving more product. Such a valve system could provide reduced power consumption and/or pressure balancing with respect to boom sections 17*a*-17*e*.

In addition, various shapes of valve plates can be implemented, preferably having features which allow some flow while fully closed. These could include a central bore or other perforations and cut-out segments or removed material for the outer periphery of the valve plate. Examples of such variations are illustrated in FIGS. 7-10, each being shown in a closed position. For example, as shown in FIG. 7, an alternative valve 112' could comprise a central bore or opening 170 in an interior of the valve plate 150. As shown in FIG. 8, another alternative valve 112" could comprise a multiple cut-out segments or openings 172 in an interior of the valve plate 150. The perimeter of the valve plate 150 could also be oval or oblong instead of round. As shown in FIG. 9, another alternative valve 112'" could comprise a valve plate 150 with a perimeter having a circular edge 180 and a straight edge 182 opposing the circular edge 180, with removed material from the lower periphery of the valve plate. As shown in FIG. 10, another alternative valve 112" could comprise a valve plate 150 with a perimeter having opposing circular edges 190, 192 and opposing straight edges 194, 196, with removed material from the left and right periphery of the valve plate. The foregoing variations of valves 112, as illustrated or as hybrid versions taking features from the certain variations as illustrated, can produce different airflow effects which may be desirable based on particular system configurations, such as fan size, fan speed, supply line diameter, supply line length, granular material type, and so forth. All such variations are within the scope of the invention.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A system for distributing particulate material from an applicator, the system comprising:
- a fan configured to produce an airflow;
- a plenum connected to the fan;
- a plurality of supply lines connected to the plenum, each supply line of the plurality of supply lines being configured to receive the airflow via the plenum and entrain particulate material in the airflow;
- a plurality of boom sections, each boom section of the plurality of boom sections supporting a plurality of nozzles, the plurality of nozzles of each boom section of the plurality of boom sections being connected to a respective supply line of the plurality of supply lines to distribute the particulate material entrained in the airflow of the respective supply line;
- a plurality of electronically controlled valves, each supply line of the plurality of supply lines being associated with a respective valve of the plurality of electronically controlled valves, each valve of the plurality of electronically controlled valves being actuatable between an open position and a closed position, wherein the airflow in each supply line of the plurality of supply lines is greater when the respective valve of the plurality of electronically controlled valves is in the open position than when the respective valve of the plurality of electronically controlled valves is in the closed position;
- a plurality of pressure sensors, each pressure sensor of the plurality of pressure sensors being configured to generate back pressure data providing a back pressure in a corresponding supply line of the plurality of supply lines; and
- a control system in communication with the plurality of electronically controlled valves and the plurality of pressure sensors, wherein the control system executes a program stored in a non-transient medium to:
receive the back pressure data generated by the plurality of pressure sensors, the data providing the back pressure in each of the plurality of supply lines; and
selectively control each valve of the plurality of electronically controlled valves based at least in part on the back pressure in each of the plurality of supply lines.

2. The system of claim 1, further comprising:
a metering section comprising a plurality of meters for distributing particulate material to the plurality of supply lines, wherein each valve of the plurality of electronically controlled valves is arranged between the fan and the metering section.

3. The system of claim 1, wherein the plurality of electronically controlled valves comprises butterfly valves.

4. The system of claim 1, wherein each valve of the plurality of electronically controlled valves comprises a plate having an area that is smaller than an area defined by an inner diameter of a corresponding supply line of the plurality of supply lines in which the plate is mounted.

5. The system of claim 4, wherein the plate is concentrically centered in the corresponding supply line of the plurality of supply lines on a shaft that is driven to pivot by an electric motor.

6. The system of claim 4, wherein the plate extends perpendicular to a longitudinal axis of the corresponding supply line of the plurality of supply lines when in the closed position.

7. The system of claim 6, wherein the airflow in the corresponding supply line of the plurality of supply lines passes through an annular gap defined between an outer edge of the plate and an inner circumferential surface of the corresponding supply line of the plurality of supply lines when in the closed position.

8. The system of claim 4, wherein the plate comprises an opening in an interior of the plate, the opening extending across a geometric center of the plate.

9. The system of claim 4, wherein the plate has a perimeter having at least one circular edge and at least one straight edge, the at least one circular edge extending across an axis of rotation of the plate, the plate being rotatable about the axis of rotation between the open and closed positions.

10. The system of claim 9, wherein the at least one circular edge includes opposing circular edges and the at least one straight edge includes opposing straight edges, each of the opposing circular edges extending across the axis of rotation of the plate.

11. The system of claim 4, wherein the plate is configured to rotate 90-degrees between the open and closed positions.

12. The system of claim 1, wherein the control system executes to actuate a first valve of the plurality of electronically controlled valves arranged in a first supply line of the plurality of supply lines to induce pressure in the first supply line so that a pressure differential between back pressure in the first supply line and back pressure in a second supply line of the plurality of supply lines is reduced.

13. An agricultural application implement comprising:
a frame;
a plurality of wheels supporting the frame;
a fan configured to produce an airflow;
a plenum connected to the fan;
a plurality of supply lines connected to the plenum, each supply line of the plurality of supply lines being configured to receive the airflow via the plenum and entrain particulate material in the airflow;
a plurality of boom sections supported by the frame, each boom section of the plurality of boom sections supporting a plurality of nozzles, the plurality of nozzles of each boom section of the plurality of boom sections being connected to a respective supply line of the plurality of supply lines to distribute the particulate material entrained in the airflow of the respective supply line;

a plurality of electronically controlled valves, each supply line of the plurality of supply lines being associated with a respective valve of the plurality of electronically controlled valves, each valve of the plurality of electronically controlled valves being actuatable between an open position and a closed position, wherein the airflow in each supply line of the plurality of supply lines is greater when the respective valve of the plurality of electronically controlled valves is in the open position than when the respective valve of the plurality of electronically controlled valves is in the closed position;

a plurality of pressure sensors, each pressure sensor of the plurality of pressure sensors being configured to generate back pressure data providing a back pressure in a corresponding supply line of the plurality of supply lines; and a control system in communication with the plurality of electronically controlled valves and the plurality of pressure sensors, wherein the control system executes a program stored in a non-transient medium to:

receive the back pressure data generated by the plurality of pressure sensors, the data providing the back pressure in each of the plurality of supply lines; and selectively control each valve of the plurality of electronically controlled valves based at least in part on the back pressure in each of the plurality of supply lines.

14. The system of claim 2, wherein each valve of the plurality of electronically controlled valves is arranged between the plenum and the metering section.

15. The system of claim 1, wherein the plurality of boom sections includes a left outer-boom section, a left inner-boom section, a right outer-boom section, and a right inner-boom section.

16. The system of claim 15, further comprising a metering section comprising a plurality of meters for distributing particulate material to the plurality of supply lines, wherein the control system is in communication with the plurality of meters, and wherein the control system executes a turn-compensation during a right-turn maneuver of the applicator by:

controlling inner valves of the plurality of electronically controlled valves arranged in inner supply lines of the plurality of supply lines associated with the right inner-boom section and the right outer-boom section to actuate towards the closed position; and controlling outer meters of the plurality of meters for outer supply lines of the plurality of supply lines associated with the left outer-boom and the left inner-boom section to increase a rate of delivery of the particulate material to the outer supply lines.

17. The system of claim 16, wherein the control system executes the turn-compensation by additionally:

controlling inner meters of the plurality of meters for the inner supply lines of the plurality of supply lines associated with the right inner-boom section and the right outer-boom section to decrease a rate of delivery of the particulate material to the inner supply lines.

18. The system of claim 2, wherein each of the plurality of pressure sensors is arranged between the plenum and the metering section.

\* \* \* \* \*